(12) United States Patent
Galich

(10) Patent No.: US 6,172,426 B1
(45) Date of Patent: Jan. 9, 2001

(54) ELECTRICAL ENERGY PRODUCING PLATFORM AND METHOD OF USE

(76) Inventor: Thomas P. Galich, 24962 Sea Crest Dr., Dana Point, CA (US) 92629-1909

( * ) Notice: Under 35 U.S.C. 154(b), the term of this patent shall be extended for 0 days.

(21) Appl. No.: 09/437,030

(22) Filed: Nov. 9, 1999

Related U.S. Application Data

(63) Continuation-in-part of application No. 09/166,691, filed on Oct. 5, 1998.

(51) Int. Cl.$^7$ .............................. H02K 35/00; F03G 3/00
(52) U.S. Cl. ............................ 290/1 R; 290/1 R; 310/15
(58) Field of Search ................................... 290/1 R, 1 A, 290/1 E, 54; 310/12, 13, 14, 15, 23

(56) References Cited

U.S. PATENT DOCUMENTS

| | | | |
|---|---|---|---|
| 2,020,361 | * 11/1935 | Johnston | 230/216 |
| 3,696,251 | * 10/1972 | Last et al. | 290/53 |
| 4,081,224 | * 3/1978 | Krupp | 417/229 |
| 4,212,598 | * 7/1980 | Roche et al. | 417/229 |
| 4,239,975 | * 12/1980 | Chiappetti | 290/1 R |
| 4,339,920 | 7/1982 | Le Van | 60/533 |
| 4,409,489 | 10/1983 | Hayes | 290/1 R |
| 4,418,542 | 12/1983 | Ferrell | 60/668 |
| 4,532,431 | * 7/1985 | Lliev et al. | 290/4 R |
| 4,614,875 | 9/1986 | McGee | 290/1 R |
| 4,700,540 | 10/1987 | Byrum | 60/325 |
| 4,739,179 | 4/1988 | Stites | 290/1 R |
| 4,924,123 | * 5/1990 | Hamajima et al. | 310/15 |
| 4,980,572 | * 12/1990 | Sen | 290/1 R |
| 5,157,922 | * 10/1992 | Baruch | 60/325 |
| 5,355,674 | 10/1994 | Rosenberg | 60/325 |
| 5,570,286 | * 10/1996 | Margolis et al. | 364/424.05 |
| 5,634,774 | * 6/1997 | Angel et al. | 417/229 |

\* cited by examiner

Primary Examiner—Nicholas Ponomarenko
(74) Attorney, Agent, or Firm—Stetina Brunda Garred & Brucker

(57) ABSTRACT

An energy platform system for generating electrical energy from the weight of a moving vehicle. The system comprises a fluid bed containing a volume of fluid which is compressible by the weight of the moving vehicle driven thereover. A circulation system is in fluid communication with the fluid bed for receiving the fluid forced from within the bladder. The circulation system is operable is operable to translate the energy of the fluid circulated therethrough into mechanical energy. The platform system additionally comprises a generator cooperatively engaged to the circulation assembly and operable to convert the mechanical energy of the circulation system into electrical energy. It is further contemplated that electricity may be produced by the movement of a vehicle over a platform mechanically coupled to a linear generator. Accordingly, the linear generator moves in relation to the movement of the platform such that the linear generator is operative to generate an electrical current thereby.

5 Claims, 4 Drawing Sheets

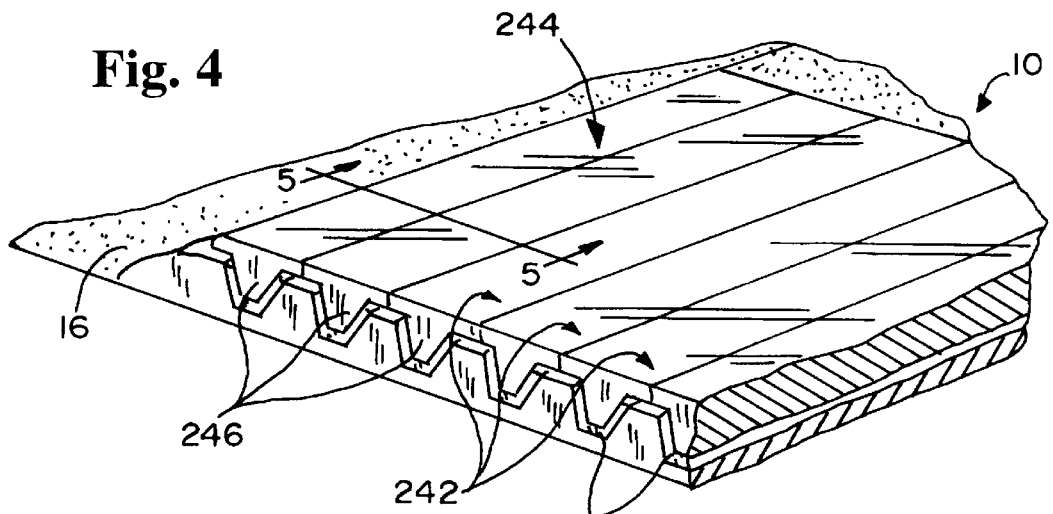
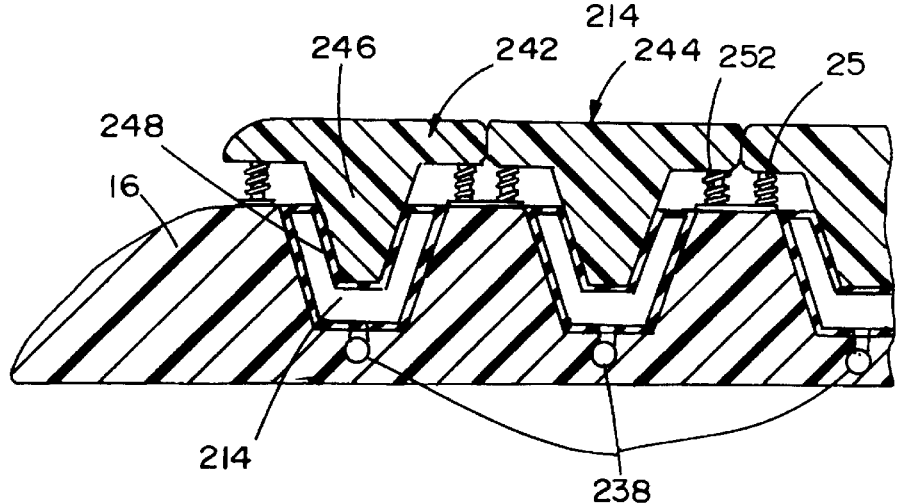

US 6,172,426 B1

ELECTRICAL ENERGY PRODUCING PLATFORM AND METHOD OF USE

CROSS-REFERENCE TO RELATED APPLICATIONS

The present application is a continuation-in-part of U.S. application Ser. No. 09/166,691 entitled ELECTRICAL ENERGY PRODUCING PLATFORM AND METHOD OF USE filed Oct. 5, 1998, the disclosure of which is expressly incorporated herein by reference.

BACKGROUND OF THE INVENTION

The present invention generally relates to electrical energy generation and more particularly to the generation of electrical energy from the existing motion and weight of a moving vehicle.

Currently fossil fuels or hydrocarbons are the main source of fuel for electrical energy generation. However, these fuels are non-renewable and eventually their supply will be exhausted. Therefore, in order to make the supply of non-renewable fossil fuels last longer, alternative energy sources have been and are being developed.

However, such alternative energy sources have not met with widespread acceptance because of their complexity and/or associated high costs. For example, solar or ocean power generation of electricity produces a clean and constant source of electricity yet is expensive and costly to develop.

Geothermal energy is also a clean and low cost source of energy that has been used in small amounts for centuries. The technology has been developed to utilize geothermal energy such that it is economical to use. However, the main drawback to geothermal energy is that it is dependent upon location and not available throughout the world.

A major supplier of renewable energy is harnessing the power of streams and dams to thereby generate electricity. However, the future of this type of electrical power generation depends on overcoming a number of environmental, regulatory and political obstacles. In this respect, a number of federal laws restrict the development of dams and electrical power generating facilities that would destroy the natural character of a region. Therefore, construction of new dams and power generating facilities face governmental and regulatory agency scrutiny that currently curtail development.

Another source of alternative energy has been the wind which has been used as a source of power generation for centuries. Generation of power from the wind reached its peak in the late nineteenth and twentieth centuries, however it is still not a significant source of energy. A primary reason for the lack of development of using wind as an energy source is due to the inconsistency of the wind and the need to store the electricity produced therefrom until there is a sufficient demand.

In addition to the above mentioned sources of alternative energy, nuclear power is also used for the generation of electricity. However, nuclear power is controversial due to the radioactive nuclear waste produced as a by-product from the generation of electricity and the problems associated with its disposal. Similarly, even the production of electricity from fossil fuels is controversial because of the waste and smog produced from the burning of hydrocarbons.

Therefore there exists a need for an electrical power generating system that can produce energy in a clean and efficient manner and yet does not further deplete the diminishing source of hydrocarbon based fuels. The present invention addresses the above-mentioned deficiencies by utilizing the untapped and free movement of already moving vehicles to thereby produce electrical energy.

BRIEF SUMMARY OF THE INVENTION

In accordance with the present invention there is provided an electrical energy producing platform system to generate electrical energy from the weight of a moving vehicle. In accordance with a first embodiment of the present invention, the system comprises a fluid bed or deformable bladder for containing a volume of hydraulic fluid that is compressible by the weight of a vehicle driven thereon to thereby force the hydraulic fluid therefrom. In fluid communication with the bladder is a circulation assembly for receiving the hydraulic fluid forced from the bladder and to feed the hydraulic fluid back into the bladder. Additionally, the circulation assembly is operable to translate the energy of the hydraulic fluid circulated therethrough into mechanical energy. Accordingly, a generator is cooperatively engaged to the circulation assembly to thereby generate electrical energy from the mechanical energy produced in the circulation assembly. In accordance with the first embodiment of the present invention, the bladder can be either placed on top of or embedded into the roadway. Therefore with this system, the motion and weight of vehicular traffic is used to initiate a fluid pumping action to thereby generate electricity.

In the first embodiment of the present invention, the circulation assembly comprises an accumulator in fluid communication with the bladder for receiving the hydraulic fluid forced from the bladder and releasing the hydraulic fluid at a prescribed pressure level. Additionally, a hydraulic pump is in fluid communication with the accumulator and mechanically coupled to the generator to produce the mechanical energy necessary to power the generator. In order to facilitate the circulation of the hydraulic fluid, there is provided a reservoir in fluid communication with the hydraulic pump and the bladder to return the hydraulic fluid from the pump to the bladder. It will be recognized that the bladder (i.e., fluid bed) can contain any type of compressible fluid, not necessarily hydraulic fluid, to convert the movement of the vehicle into electrical energy.

The bladder in the first embodiment of the present invention may comprise a plurality of cells that divide the bladder into individual chambers. Each chamber of the bladder is connected to a manifold in communication with the accumulator. Alternatively, the system may comprise a plurality of bladders wherein each individual bladder is connected to the manifold. In either case, the plurality of bladders or cells collectively function to circulate the hydraulic fluid through the circulation assembly.

The electrical generator may be a linear generator operative to generate electrical current through the movement thereof. Accordingly, the linear generator may be mechanically coupled to the pump such that the pump reciprocally moves the linear generator. The linear generator comprises an elongate cylinder having a hollow interior. Disposed about the exterior of the cylinder is a coil. Inserted within the interior of the cylinder is an elongate rod and magnet. The magnet is slidably coupled to the rod and disposed within the interior of the cylinder. Accordingly, as the cylinder is moved, the magnet is moved within the interior thereof. The movement of the magnet produces an electrical current within the coil such that electrical energy is produced by the linear generator.

In a second embodiment of the present invention, the energy producing platform system comprises at least one rigid movable beam depressible by the weight of a moving vehicle driven thereover. The beam is cooperatively engaged with a deformable bladder containing hydraulic fluid such that the depression of the beam compresses the bladder to thereby force the hydraulic fluid therefrom. In the second embodiment of the present invention, the bladder is in fluid communication with a circulation assembly for receiving the hydraulic fluid from the bladder and translating the energy of the hydraulic fluid circulated therethrough into mechanical energy. As previously described in the first embodiment, a generator, such as a linear generator, is cooperatively engaged to the circulation assembly to thereby convert the mechanical energy of the circulation assembly into mechanical energy. Additionally, the beam may be formed with a generally V-shaped appendage that is receivable into a generally V-shaped channel of the bladder in order to aid in compression of the bladder. Similar to the first embodiment of the present invention, the circulation assembly of the second embodiment comprises an accumulator, a hydraulic pump and a reservoir to produce mechanical energy from the circulation of the hydraulic fluid. In accordance with the second embodiment of the present invention, at least one pilot pin and a spring maintain the beam in horizontal position and also bias the beam upward and away from the roadway.

In accordance with a third embodiment of the present invention, the electrical energy producing platform system comprises a platform downwardly movable from the weight of a moving vehicle driven thereover. A lever arm is mechanically coupled to both the platform and a hydraulic cylinder to transfer the movement of the platform to the hydraulic cylinder. Therefore, the hydraulic cylinder contains a volume of hydraulic fluid that is forced from the cylinder by the downward movement of the platform that is transferred through the lever arm. In order to produce electrical energy, the hydraulic cylinder is in fluid communication with a circulation assembly for translating the energy of the hydraulic fluid into mechanical energy. Similar to the first and second embodiments of the present invention, the circulation assembly comprises an accumulator, a hydraulic pump and a reservoir for producing the mechanical energy necessary to power a generator such as a linear generator. In the third embodiment of the present invention, the platform is normally biased upward with springs and is maintained in a prescribed horizontal position by pilot pins. Additionally, the platform may comprise a plurality of beams with corresponding levers and hydraulic cylinders in communication with the circulation assembly in order to power the generator.

Alternatively, in the third embodiment of the present invention, the platform may be mechanically coupled to the linear generator. The linear generator is attached to the platform and operative to move in relation to the movement of the platform. Accordingly, as the linear generator moves in relation to the platform, electrical energy is produced thereby. The linear generator may be mechanically coupled to the platform with a lever arm that causes the linear generator to move in relation to the movement of the platform.

In accordance with a fourth embodiment of the present invention, the wheel of a train generates electrical energy by compressing a deformable bladder containing a hydraulic fluid disposed near the rail of a railroad track. The compression of the bladder from the wheel of the train forces the hydraulic fluid therefrom. In fluid communication with the bladder is a circulation assembly for translating the energy of the hydraulic fluid circulated therethrough into mechanical energy. In accordance with the fourth embodiment, a generator, such as a linear generator, is cooperatively engaged to the circulation assembly to generate electrical energy from the mechanical energy produced by the circulation assembly. The fourth embodiment can further comprise a plurality of deformable bladders in communication with a manifold in order to operate cooperatively with the circulation assembly. Additionally, as previously discussed, the circulation assembly may comprise an accumulator, a hydraulic pump and a reservoir in order to facilitate the production of mechanical energy from the circulation of the hydraulic fluid.

In accordance with the present invention, there is also provided a method of producing electrical energy by driving a vehicle over a deformable bladder containing a volume of hydraulic fluid. The bladder is compressed from the weight of the vehicle to thereby force the hydraulic fluid therefrom. The energy of the hydraulic fluid is translated into mechanical energy which is converted into electrical energy. In addition to the foregoing, the present invention further comprises a method of producing electrical energy by driving a vehicle over a depressible rigid beam. The beam depresses and therefore compresses a deformable bladder containing a volume of hydraulic fluid cooperatively engaged with the beam. The energy of the forced hydraulic fluid is translated into mechanical energy which in turn is converted into electrical energy.

Furthermore, an additional method of producing electrical energy comprises driving a vehicle over a downwardly movable platform mechanically coupled to a hydraulic cylinder containing a volume of hydraulic fluid. As such, the hydraulic fluid is forced from the cylinder and the energy from the forced hydraulic fluid is translated into mechanical energy which in turn is converted to electrical energy.

A method for producing electrical energy from a train comprises the steps of compressing a deformable bladder disposed adjacent to a rail of a railroad track with a train wheel. Hydraulic fluid within the bladder forced therefrom and used to produce mechanical energy that is converted into electrical energy.

BRIEF DESCRIPTION OF THE SEVERAL VIEW OF THE DRAWINGS

These as well as other features of the present invention, will become more apparent upon reference to the drawings wherein:

FIG. 4 is a partial perspective view of an electrical energy producing platform system constructed in accordance with a second embodiment of the present invention;

FIG. 5 is a cross-sectional view taken along line 5—5 of FIG. 4;

DETAILED DESCRIPTION OF THE INVENTION

Figure 1:
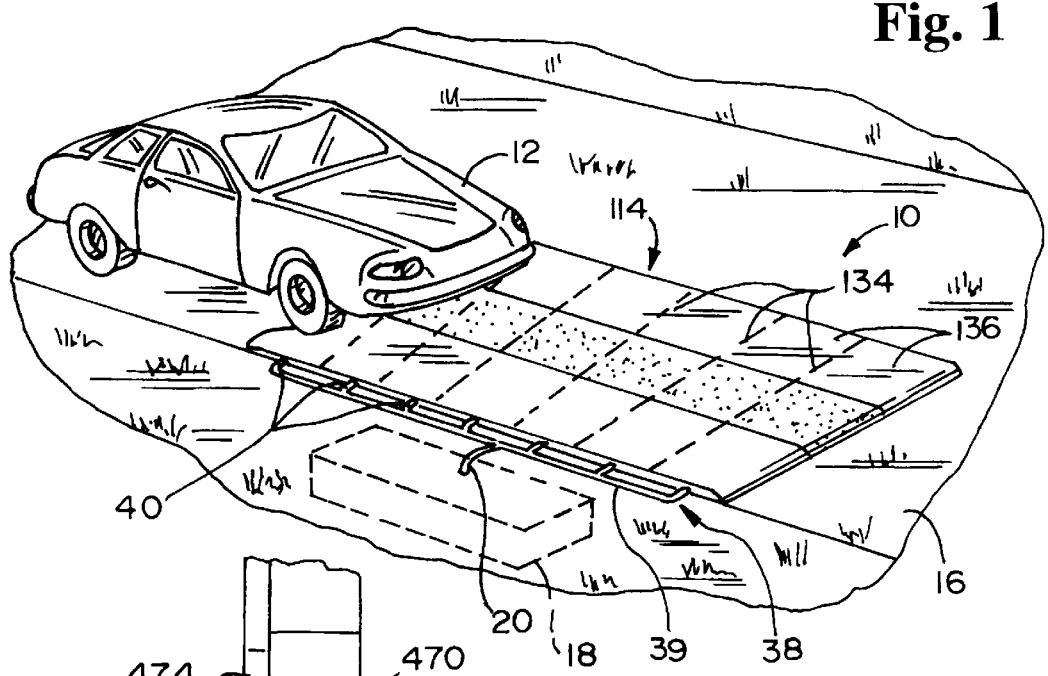
FIG. 1 is a perspective view of an electrical energy producing platform system constructed in accordance with a first embodiment of the present invention, illustrating the manner in which electrical energy is produced by the passage of a vehicle thereover.

Referring now to the drawings wherein the showings are for purposes of illustrating preferred embodiments of the present invention only, and not for purposes of limiting the same, FIG. 1 is a perspective view of an electrical energy producing platform system 10 constructed in accordance with a first embodiment to generate electrical energy from the weight and movement of a vehicle 12. The system 10 comprises a bladder 114 or fluid bed upon which a vehicle 12 is driven over. In the first embodiment of the present invention, as shown in FIG. 1, the bladder 114 retains a volume of hydraulic fluid and is fabricated from a highly durable material such that it can take the abuse of being driven over by motorized vehicles. In addition to being durable, the preferred material from which the bladder 114 is constructed is resilient or elastic such that after the bladder 114 is compressed from the weight of vehicle 12, it reassumes its original shape and volume after the vehicle 12 has driven thereover.

The bladder 114 is placed on the surface of a road 16 such that vehicles 12 must drive over the bladder 114. Ideally, the bladder 114 is adaptable to be placed on existing vehicle arteries and especially on freeway on-ramps and off-ramps or other high vehicular travel routes such as ingress or egress routes to shopping malls, parking lots, or the like. The bladder 114 is compressed from the weight of vehicle 12 as it drives over bladder 114 to thereby pressurize and provide a "prime mover" force onto the hydraulic fluid contained therein. Therefore, the "prime mover" in this invention is the motion and weight of a vehicle passing over the system 10 to thereby initiate a fluid pumping action that will be used with a hydraulic system that converts the energy of the "prime mover" into mechanical energy.

Figure 2:
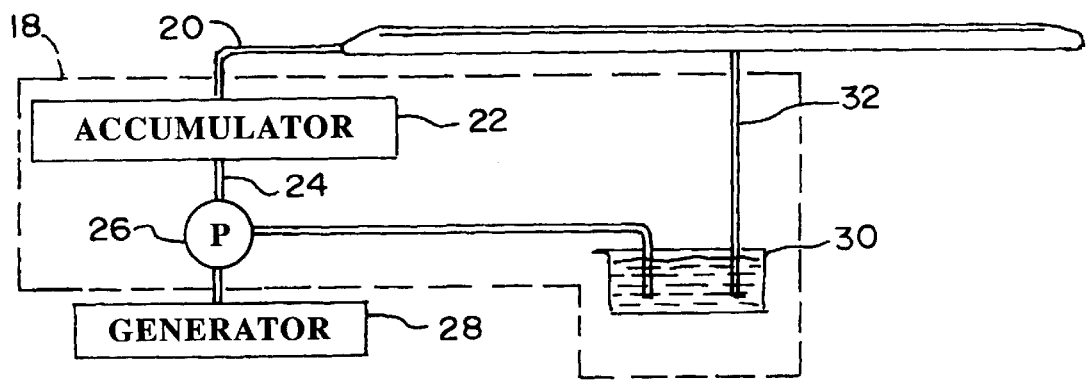
FIG. 2 is a block diagram of the platform system shown in FIG. 1.

Specifically, FIG. 2 shows a circulation assembly 18 wherein the compression of bladder 114 forces the pressurized hydraulic fluid through a first conduit 20. Attached to first conduit 20 is an accumulator 22 for receiving and releasing the pressurized hydraulic fluid at a prescribed pressure level. Therefore, hydraulic fluid is released from the accumulator 22 through a second conduit 24 to a hydraulic pump 26. The hydraulic pump 26 converts the energy from the circulating hydraulic fluid into mechanical energy as is currently known in the art. Therefore, an electrical generator 28 cooperatively engaged to pump 26 is powered from the mechanical energy produced by pump 26 to thereby produce electrical energy. The electrical generator 28 is metered on line into existing electrical energy transport carrier lines in order to be distributed to areas where the electricity is needed. As such, the present invention can provide a source of clean electrical energy from the weight and movement of vehicle 12 driven over bladder 114.

Figure 9:
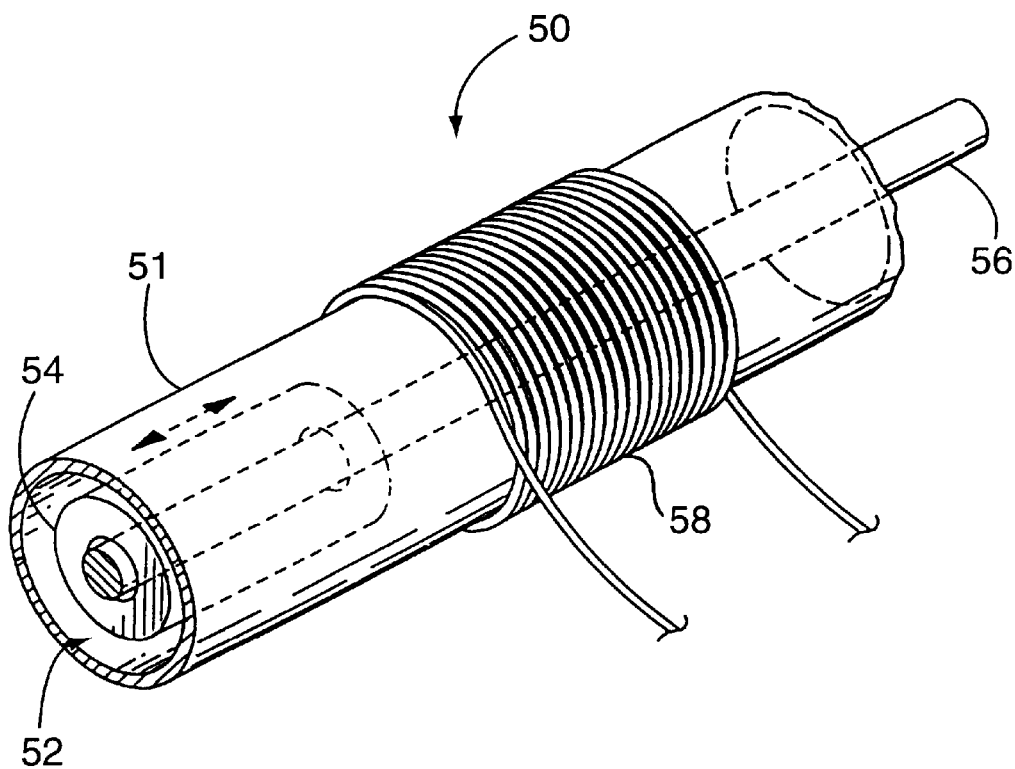
FIG. 9 is a perspective view of a linear generator used with the electrical energy producing platform system of the present invention.

The generator 28 may be a linear generator 50 that produces electricity from the mechanical energy of pump 26. As seen in FIG. 9, the linear generator 50 is an elongate, tubular cylinder 51 having a hollow interior 52. Disposed within the hollow interior 52 is a cylindrical magnet 54 slidably disposed along an elongate rod 56. The elongate rod 56 centers the magnet 54 within the cylinder 51 and allows the magnet 54 to slide axially therein. Wound about the exterior of the of the cylinder 51 is a coil 58 of electrically conducting wire. Accordingly, the magnet 54 induces a current within the coil 58 as it is slidably moved along rod 56.

The pump 26 may be mechanically coupled to the magnet 54 in order to move the same within the cylinder 51 of the linear generator 50. Alternatively, the pump 26 may produce a reciprocating motion that rocks the cylinder 51 and slides the magnet 54 along the rod 56. Specifically, the pump 26 may be mechanically coupled to the cylinder 51 such that the cylinder 51 is rocked in a see-saw manner which slides the magnet 54 along rod 56. The movement will be reciprocating such that once the magnet 54 has been moved toward one end of the cylinder 51, the cylinder 51 will then be moved in an opposite direction such that the magnet 54 will slide toward the other end. The magnet 54 induces an electrical current in the coil 58 from the movement therefrom to produce electrical energy.

Additionally, the circulation assembly 18 comprises a reservoir 30 to return the hydraulic fluid from the pump 26 through a third conduit 32 back to bladder 114. Hydraulic fluid is returned to the bladder 114 through a suction action that is created when bladder 114 returns to its original shape after a vehicle 12 has compressed bladder 114.

A bladder 114 constructed in accordance with the first embodiment is preferably fabricated with a plurality of cell walls 134 dividing bladder 114 into a plurality of compartments or cells 136. Attached to bladder 114 is manifold 38 comprising a primary manifold segment 39 having multiple secondary manifold segments 40 extending perpendicularly therefrom. Each individual cell 136 will be fluidly connected to the primary manifold segment 39 of manifold 38 via a respective secondary manifold segment 40. In order for proper operation, there will be a check valve in each secondary manifold segment 40 to prevent pressurized hydraulic fluid from flowing back into any uncompressed cells 136 of the bladder 114. The manifold 38 is connected to circulation assembly 18 through first conduit 20 to thereby produce electrical energy as previously described. Additionally, a plurality of individual bladders 114 may also be fluidly connected to the manifold 38 through respective ones of the secondary manifold segments 40 such that the plurality of bladders 114 function cooperatively to pressurize and circulate the hydraulic fluid to pump 26.

As will be recognized, a single bladder 114 may be used individually in the first embodiment of the present invention. As shown in FIG. 2, a single bladder 114, without cells 136, is used for pressurizing and circulating the hydraulic fluid. As such, a single bladder 114 will be directly coupled to accumulator 22 through first conduit 20 without the use of a manifold 38. Therefore, a single bladder 114 can produce electrical energy with circulation assembly 18 as previously described above.

As will be recognized, the system 10 provides a source of energy from the movement of trucks and automobiles. The system 10 therefore takes advantage of the free source of energy from vehicles already moving to their intended destinations. Therefore, the system 10 does not deplete the dwindling supply of hydrocarbon fuels because when the bladder 114 is placed upon an existing roadway or artery, it will take advantage of the free source of energy from the vehicles already driving on the road. Additionally, the system 10 can be placed on highways already owned and operated by the state or federal government thereby negating the need for purchasing property. As such, system 10 provides a clean source of electrical energy generation from one of the major sources of pollution into the atmosphere during the 20th century, namely the automobile with an internal combustion engine.

In accordance with a second embodiment of the present invention as shown in FIGS. 4 and 5, the system 10 is placed on roadway 16 and comprises a plurality of rigid metallic movable beam 242 in contact with a plurality of respective deformable bladders 214 that contain a volume of hydraulic fluid. The bladder 214 can be fabricated from the same material as bladder 114 of the first embodiment such that bladders 114 and 214 have the similar elastic and resilient properties. As best seen in FIG. 4, the plurality of generally parallel, side-by-side beams 242 form a vehicle surface 244 on which a vehicle 12 drives over. As depicted in FIG. 5, the beam 242 is formed with a generally V-shaped appendage 246 that projects downwardly from vehicle surface 244. Accordingly, a bladder 214 is formed with a generally V-shaped channel 248 that cooperatively engages the complementary V-shaped appendage 246 of a respective beam 242 positioned directly above. Therefore, appendage 246 engages channel 248 to compress bladder 214 when beam 242 is directed downwardly toward roadway 16. However, it is not necessary that beam 242 and bladder 214 have corresponding surfaces that are V-shaped. As will be recognized, the beam 242 and bladder 214 can be any shape that facilitates the compression of bladder 214 and the pressurization and circulation of a hydraulic fluid contained within bladder 214.

In order to maintain beam 242 in a prescribed horizontal position while a vehicle is driven thereover, pilot pins 250 are mechanically attached to the roadway 16 and each beam 242 to allow beam 242 to be slidably movable in a vertical direction only. For proper operation, the beam 242 must travel in a downward direction toward roadway 16 when a vehicle travels over vehicle surface 244 in order to compress bladder 214 with appendage 246. Therefore, springs 252 are mechanically attached to each beam 242 and the road 16 to normally bias beam 242 upward and away from bladder 214 when a vehicle is not being driven thereover.

As can be further seen in FIG. 5 for the second embodiment of the present invention, the bladder 214 is connected to a manifold system 238 which in turn is connected to circulation assembly 18 at first conduit 20 to produce electrical energy from the pressurization and circulation of hydraulic fluid as previously described. Therefore, a plurality of beams 242 are in fluid communication with one another by manifold 238 to form system 10. In order for proper operation, the plurality of beams 242 are placed in side-by-side parallel relation to each other but in generally perpendicular relation to the direction of travel of vehicle 12. By using a plurality of beams 242, it is possible to generate more electrical energy from the movement of the same vehicle. Alternatively, it is also contemplated that each bladder 214 may be connected to an individual circulation assembly 18 in order to provide redundant operation in case of failure of circulation assembly 18. It will also be recognized that it is not necessary to use a plurality of beams 242 with a plurality of bladders 214 to form a system 10, but that a large single beam 242 may be used with a large single bladder 214 and a circulation assembly 18 to comprise system 10.

Figure 6:
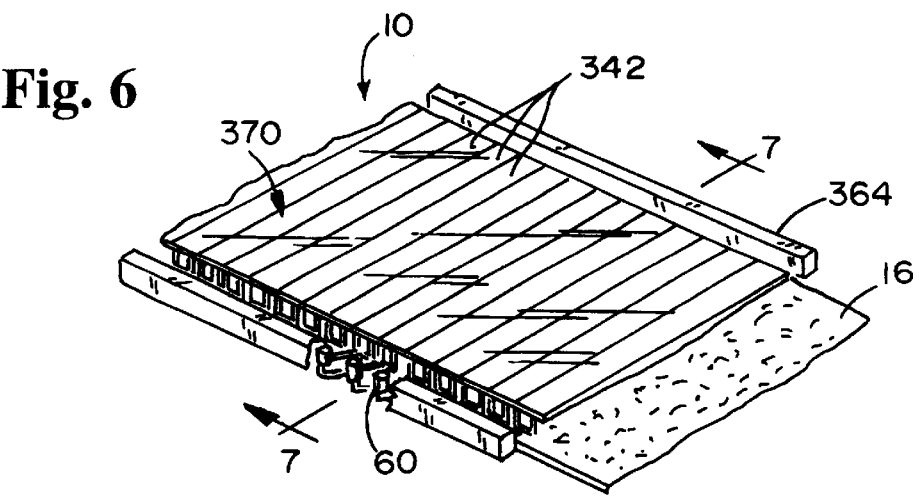
FIG. 6 is a perspective view of an electrical energy producing platform system constructed in accordance with a third embodiment of the present invention.
Figure 7:
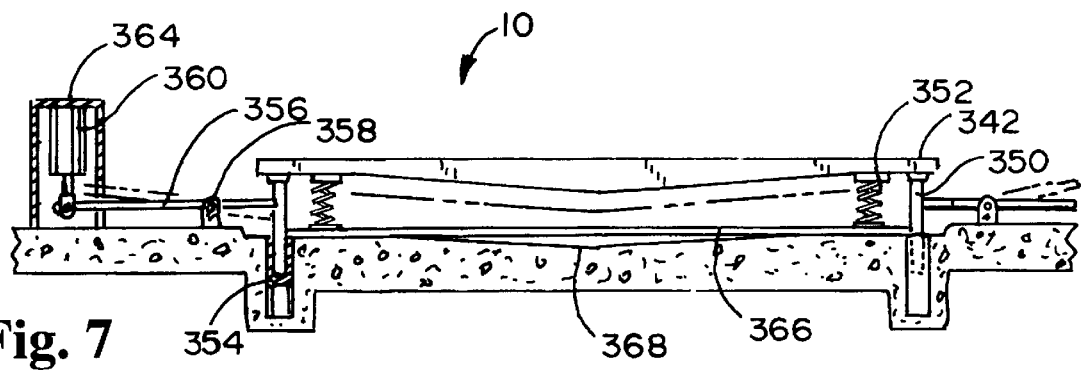
FIG. 7 is a cross-sectional view taken along line 7—7 of FIG. 6.

In accordance with a third embodiment of the present invention, the system 10 comprises a plurality of rigid metallic movable beams 342, as seen in FIG. 6, to form a platform 370 over which vehicle 12 is driven. The plurality of elongate beams 342 are configured in side-by-side, generally parallel relation to each other and in generally perpendicular relation to the direction of travel of vehicle 12. As seen in FIG. 7, which is a cross-sectional view of an individual beam 342 taken across line 7—7 of FIG. 6, the beam 342 is supported above roadway 16 by coil springs 352 mechanically attached to beam 342. The springs 352 normally bias the beam 342 in an upward direction away from roadway 16 when a vehicle is not being driven thereover. Support pins 350 mechanically attached to the bottom surface of a beam 342 maintain the horizontal position of beam 342 such that the plurality of beams 342 are in generally parallel relation to each other.

Figure 8:
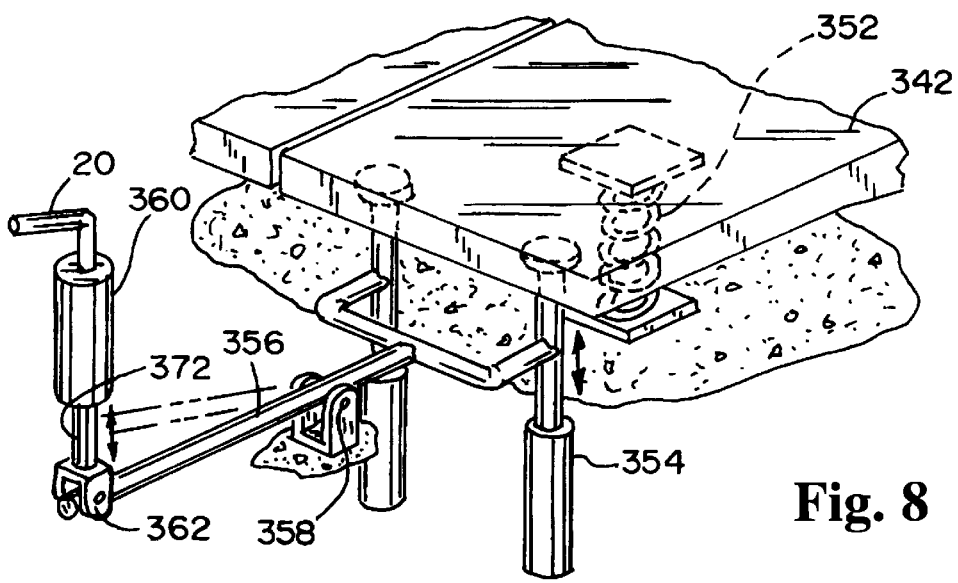
FIG. 8 is a partial perspective view of a mechanical linkage of the electrical energy producing platform system shown in FIGS. 6 and 7.

As seen in FIG. 8, each support pin 350 is slidably insertable into a respective sleeve 354 imbedded into roadway 16 which allow each beam 342 to be movable in a vertical direction only. Sleeve 354 may be filled with a fluid to facilitate the dampening of the downward movement of beam 342 as a vehicle 12 is driven thereover. Mechanically coupled to each support pin 350 is a lever arm 356 that facilitates in transferring the downward movement of beam 342. The lever arm 356 has a hinge point 358 whereby lever arm 356 pivots to transfer the movement of support pin 350 to a piston rod 372 of a hydraulic cylinder 360 via coupling 362. Therefore for proper operation of the third embodiment of the present invention, as beam 342 is depressed downward toward roadway 16 from the weight of a vehicle 12, the lever arm 356 will transfer this movement to the piston rod 372 of hydraulic cylinder 360. It is preferable that hydraulic cylinder 360 contain a volume of hydraulic fluid and be in fluid communication with circulation assembly 18 through first conduit 20. Therefore, as piston rod 372 is depressed into hydraulic cylinder 360, the hydraulic fluid contained therein is pressurized and forced into circulation assembly 18 through first conduit 20. As previously described, circulation assembly 18 converts the energy of the hydraulic fluid into mechanical energy to thereby produce electrical energy. Alternatively, hydraulic cylinder 360 may be a pneumatic cylinder to produce compressed air which can power a generator as will be recognized by those skilled in the art.

In the third embodiment of the present invention, the beam 342 is linked to a lever arm 356 and corresponding hydraulic cylinder 360 on both sides of the roadway 16 as shown in FIGS. 6 and 7. A plurality of hydraulic cylinders 360 are protected from environmental elements by a protective cover 364 that encloses the cylinders 360 and forms a curb for roadway 16. As will be recognized, a plurality of hydraulic cylinders can be interconnected by to a single circulation assembly 18 by a manifold in order to power a single generator, or each hydraulic cylinder 360 may be connected to a respective individual circulation assembly 18 for redundancy of operation.

Additionally in the third embodiment of the present invention, an elastic dampening gasket 366 is positioned between each beam 342 and roadway 18 in order to dampen the noise and shock of the downward movement of beam 342. As seen in FIG. 7, the bottom of beam 342 will contact the dampening gasket 366 when the beam 342 is fully depressed downward from the weight of vehicle 12. In order to allow full depression of beam 342, the roadway 16 has an indent 368 formed therein that matches the shape of the bottom surface of beam 342 such that the dampening gasket 366 can fully deform when beam 342 is fully depressed toward roadway 16. Dampening gasket 366 is fabricated from an elastic material that can dampen the downward movement of beam 342 yet will reassume its original shape after being depressed downward.

As will be recognized to those of ordinary skill in the art, the lever arm 356 of each beam 342 may be mechanically coupled to the linear generator 50. The lever arm 356 is attached to the linear generator 50 such that as the lever arm 356 is moved, the cylinder 51 is rocked in response thereto. Accordingly, the magnet 54 disposed within the cylinder 51 is slidably moved along rod 56 as previously described above. As the magnet 54 moves along the rod 56, an electrical current is produced within the coil 58. The lever arm 356 will rock the cylinder 51 in a see-saw manner such that the magnet 54 will be moved back and forth along the rod 56 to produce electrical energy.

Ideally, the system 10 may be placed on portage roads that parallel freeways or on the on-ramps or off-ramps of freeways because of the large volume of vehicles that traverse these types of high density thoroughfares. The system 10 would therefore be used in metropolitan areas with a high population and a resultant high volume of vehicular traffic in order to produce a maximum amount of electrical energy at a cost equal to or lower than other alternative sources of electrical energy. As such, system 10 would not be used in rural or low population areas where automobile usage is correspondingly low.

Freeway on-ramps are ideally suited for placement of system 10 because vehicles are beginning to accelerate onto the freeway and the driver and passengers will not mind the momentary jarring effect from the compression of a bladder or depression of a beam. Additionally, the second or third embodiments of the present invention can be used as an extra safety measure on freeway off-ramps to slow down vehicles as they exit. If the second or third embodiments of the present invention are placed at a freeway off-ramp, the movement of beam 242 or 342 can be adjusted to cause an excessive jarring motion in the vehicle driven thereover to cause the driver of the vehicle to slow down. Therefore, the second and third embodiments of the present invention can be used as "speed bumps" to slow down vehicles exiting a freeway that are capable of producing electrical energy.

Figure 3:
FIG. 3 is a partial cross-sectional view of an electrical energy producing platform system constructed in accordance with a fourth embodiment of the present invention for particular use in conjunction with trains.

Referring now to FIG. 3 showing a fourth embodiment of the present invention, a system 10 produces electrical energy from the movement and weight of a railroad locomotive and its associated cars. A wheel 470 of a locomotive or railroad car travels on a rail 472 of a railroad track. An inboard retainer flange 474 protrudes downwardly from wheel 470 to maintain the wheel 470 and therefore the railroad car on rail 472. Disposed inboard of rail 472 is a compressible bladder 414 similar to the type used in the first and second embodiments of the present invention. The bladder 414 is formed such that it protrudes slightly above the bottom most portion of flange 474 as shown by the dotted line in FIG. 3. Therefore, as a locomotive or railroad car travels over bladder 414, the flange 474 compresses bladder 414 downward. As bladder 414 is compressed, it pressurizes and circulates hydraulic fluid to circulation assembly 18 in fluid communication with bladder 414 to generate electrical energy as previously described above.

As will be recognized in the fourth embodiment of the present invention, a plurality of bladders 414 disposed linearly inboard of rail 472 may be interconnected by a manifold in order to produce electrical energy. Alternatively, a single bladder 414 may comprise multiple compartments or cells interconnected to one another through the use of a manifold or other similar device in order to facilitate the circulation of hydraulic fluid and the production of electrical energy therefrom. Therefore, the power generation features of the fourth embodiment are similar to the first and second embodiments wherein the bladder 414 pressurizes and circulates hydraulic fluid to circulation assembly 18 to produce electrical energy from the movement of the train.

Additionally, it is contemplated that both rails of a railroad track may be equipped with the energy producing platform system 10 in order to produce electricity from the wheels on both sides of the train.

It will be recognized by those of ordinary skill in the art, that it is not necessary that hydraulic fluid be used within the first, second, third and fourth embodiments of the system 10. Any type of fluid (i.e., liquid or gas) is capable of operating the system 10 and producing energy. In this regard, the fluid is operated upon by the vehicle 12 in order to produce electrical energy. Hydraulic fluid is used as an example of one such type of fluid, but in no way is limiting.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An energy platform system to generate electrical energy from the weight of a moving vehicle, the system comprising:
   a platform which is movable from the weight of a vehicle driven thereover; and
   a linear generator mechanically coupled to the platform and operative to move in response to the movement of the platform, the linear generator comprising:
   an elongate, tubular cylinder having an exterior surface and a hollow interior;
   a coil wrapped about the exterior surface of the cylinder;
   an elongate rod disposed within the interior of the cylinder; and
   a magnet slidably attached to the rod and disposed within the interior of the cylinder such that the movement of the magnet within the cylinder produces an electrical current within the coil.

2. The energy platform system of claim 1 further comprising a lever arm mechanically coupled to the platform and the linear generator and operative to move the linear generator in response to the movement of the platform.

3. The energy platform system of claim 1 further comprising:
   at least one spring mechanically coupled to the platform to normally bias the platform upwardly; and
   at least one pilot pin mechanically coupled to the platform to maintain the platform in a prescribed horizontal position.

4. A method of generating electrical energy form a moving vehicle comprising the steps of:
   a) driving the vehicle over a platform which is mechanically coupled to a linear generator having:
      i) an elongate, tubular cylinder having an exterior surface and a hollow interior;
      ii) a coil wrapped about the exterior surface of the cylinder;
      iii) an elongate rod disposed within the interior of the cylinder; and
      iv) a magnet slidably attached to the rod and disposed within the interior of the cylinder;
   b) moving the linear generator in response to the movement of the platform; and
   c) generating electrical energy with the linear generator.

5. The method of claim 4 wherein step (b) comprises moving the linear generator in a see-saw motion to produce electrical energy.

* * * * *